Nov. 22, 1938.     W. K. FLAVIN     2,137,608
GUARD FOR RAKES
Filed Oct. 28, 1936
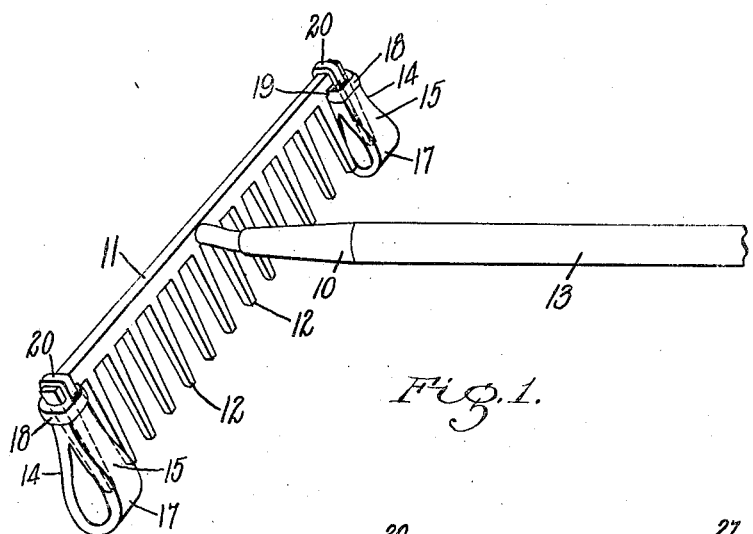
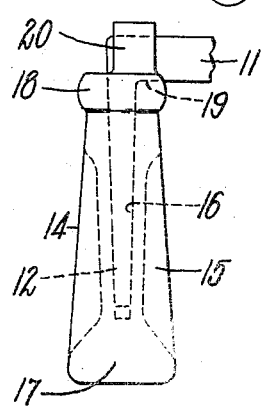
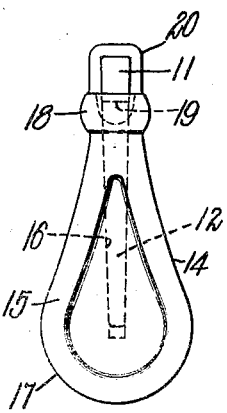
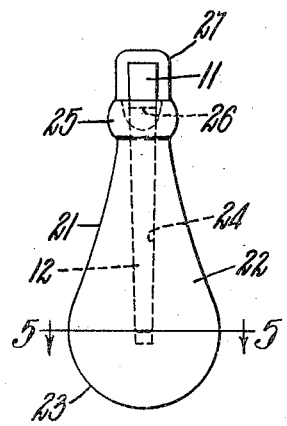
Fig.2.   Fig.3.   Fig.4.
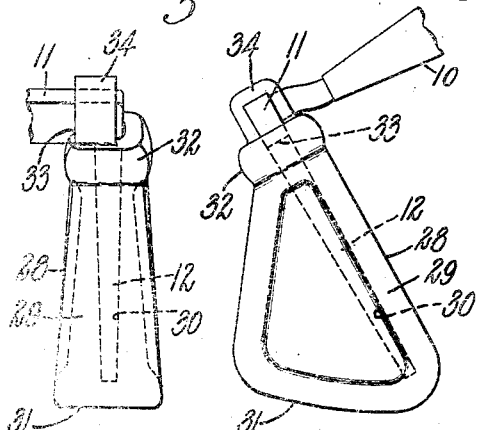
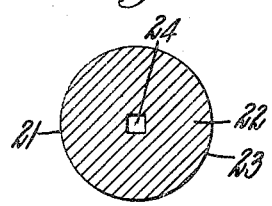
Fig.5.
Fig.6.   Fig.7.
Inventor:
Walter K. Flavin.
by Franklin E. Low.
Att'y.

Patented Nov. 22, 1938

2,137,608

UNITED STATES PATENT OFFICE 2,137,608

GUARD FOR RAKES

Walter K. Flavin, Arlington, Mass.

Application October 28, 1936, Serial No. 107,927

6 Claims. (Cl. 55—10)

This invention relates to a guard for rakes, and has for its object to provide a guard which may be easily and quickly applied to the end teeth of a rake for the purpose of supporting the intermediate teeth thereof in a slightly elevated position above the surface of the ground and below the tips of the grass, in order that the roots of said grass will not be disturbed and the appearance of the lawn injured when a rake is pulled thereover.

Another object of the invention is to provide a device of the character mentioned, preferably constructed of rubber or similar material and having an expandible and contractable band embodied therein whereby the device may be attached to rakes of different sizes and having teeth of different lengths and diameters.

Another object of the invention is to provide a device having an arcuate lower edge adapted to contact with the ground, and one embodiment of the invention contemplates forming this arcuate surface in such a manner that by tipping the handle of the rake at different angles to the surface of the ground the points of the teeth of said rake may be raised or lowered as may be desired, as the rake is pulled thereover.

The invention consists in a guard for a rake as set forth in the following specification and particularly as pointed out in the claims thereof.

Referring to the drawing:

Fig. 1 is a perspective view of a rake having guards embodying my invention attached to the end teeth thereof.

Fig. 2 is a front elevation of one type of guard embodying my invention.

Fig. 3 is a side elevation of the guard illustrated in Fig. 2.

Fig. 4 is a side elevation of another type of guard embodying my invention.

Fig. 5 is a horizontal section taken on the line 5—5 of Fig. 4.

Fig. 6 is a rear elevation of another type of guard embodying my invention.

Fig. 7 is a side elevation of the guard illustrated in Fig. 6.

Like numerals refer to like parts throughout the several views of the drawing.

In the drawing, referring particularly to Figs. 1, 2 and 3, 10 represents a metal garden type rake embodying therein a head 11, teeth 12, and handle 13, all of well-known form and construction, and it is a well-known fact that when this type of rake is used upon a lawn much care must be taken to prevent the grass from being uprooted with consequent injury to the lawn when the rake is pulled thereover. To prevent such injury a guard 14 embodying my invention is applied to each of the end teeth 12 of the rake, as illustrated in Fig. 1. The guard 14 comprises a body portion 15 preferably constructed of a flexible material, as for example, rubber, or a material having the qualities and characteristics of rubber. The body portion 15 has an aperture 16 provided therein adapted to receive an end tooth 12, and it is desirable that said tooth shall be a snug fit in said aperture 16 and that the material of the body portion shall readily adapt itself to the various shaped teeth that may be encountered upon different types and sizes of rakes. A lower surface 17 of the body portion 15 is arcuate and approximately concentric with the point of the tooth 12, and changes in the inclination of the handle 13 of the rake will not appreciably vary the distance between the points of the intermediate teeth and the ground located therebeneath.

A bead 18 is formed at the top of the body portion 15 and said bead is slotted at 19 to receive the lower edge portion of the head 11 in a manner to prevent said body portion from rotating upon the teeth 12 and thereby becoming displaced radially thereon. An expandible and contractable band 20 is formed integral with the bead 18 and co-operates therewith to form a loop, and after the body portion 15 has been applied to an end tooth 12, said band is stretched over an end of the head 11 of the rake as illustrated in Fig. 1 and thereafter acts to hold the body portion firmly in position upon said tooth.

Preferably the aperture 16 in the body portion 15 is sufficiently deep to permit a certain amount of adjustment of the device lengthwise of the teeth 12 if an adjustment is desired, it being understood that there is sufficient elasticity to the material of which the body portion 15 is constructed to permit the aperture 16 to expand and contract and therefore increase in diameter when the body portion is applied to the teeth, and the gripping action of the material in many instances will be sufficient to hold the device firmly at different elevations upon said teeth. The height, therefore, that the points of the intermediate teeth are positioned above the ground may be varied by varying the elevation of the body portion upon the teeth.

When the guards of this invention have been applied to the end teeth of a rake, the latter may be pulled over the surface of a lawn with the arcuate surfaces 17 only of the guards contacting with said lawn and the points of the intermediate teeth 12 will be elevated sufficiently to clear the ground and all danger of digging into the ground and uprooting the grass, and thereby injuring the appearance of the lawn will be eliminated.

In Figs. 4 and 5 I have illustrated another embodiment of my invention in which a guard 21 comprises a body portion 22 constructed of a material similar to the guard 14 and having a semispherical lower end portion 23, thereby providing an arcuate ground-engaging surface which is approximately concentric with the point of a tooth 12 of a rake 10. The body portion 22 has an aperture 24 therein adapted to receive an end tooth 12 of the rake 10, and a bead 25 at the top of the body portion is slotted at 26 to receive the lower edge portion of the head 11 of said rake in a manner to prevent said body portion from rotating upon said tooth. An expandible and contractable band 27 is formed integral with the bead 26 and co-operates therewith to form a loop which upon being applied to the head 11 of a rake acts to hold the body portion firmly in position upon an end tooth thereof.

In Figs. 6 and 7 I have illustrated still another modified embodiment of the invention in which a guard 28 comprises a body portion 29 preferably constructed of a flexible material, as, for example, rubber, or a material having the qualities and characteristics of rubber. The body portion 29 has an aperture 30 provided therein adapted to receive an end tooth 12 of a rake 10, and it is desirable that said tooth shall be a snug fit in said aperture 30 and that the material of the body portion shall readily adapt itself to the various shaped teeth provided upon different types and sizes of rakes. A lower surface 31 of the body portion 29 is arcuate and eccentrically disposed to the point of the tooth 12, and changes in the inclination of the handle 13 of the rake will cause the body portion 29 to rock upon the arcuate surface 31 thereby causing the points of the intermediate teeth 12 to be raised or lowered with respect to the surface of the ground over which the rake may be pulled. A bead 32 is formed at the top of the body portion 29 and said bead is slotted at 33 to receive the lower edge portion of the head 11 of the rake in a manner to prevent said body portion from rotating upon the tooth 12 and thereby becoming displaced thereon. An expandible and contractable band 34 is formed integral with the bead 32 and co-operates therewith to form a loop which, upon being applied to the head 11 of a rake, acts to hold the body portion 29 firmly in position upon an end tooth thereof.

The various embodiments of this invention are all applied in the same manner to the end teeth of a rake to hold the intermediate teeth thereof elevated a predetermined distance above surface of the ground and thereby prevent said teeth from digging into the surface of the ground and injuring the appearance of the lawn. The ground engaging surfaces of the various guards are all arcuate and the effectiveness of the rake in picking up lawn clippings may be varied to suit any depth of grass by varying the position of the guards upon the end teeth or by varying the inclination of the handle with respect to the ground as the rake is pulled thereover.

I claim:

1. A guard for a rake having a head and teeth comprising a body portion adapted to embrace a tooth of said rake, and a rubber band fast to said body portion and adapted to be expanded over the head of said rake and hold the body portion on said tooth.

2. A guard for a rake having a head and teeth comprising a body portion constructed of a material having the characteristics of rubber and adapted to embrace a tooth of said rake, and a band integral with said body portion and adapted to be expanded over the head of said rake and thereby hold the body portion on said tooth.

3. A guard for a rake having a head and teeth comprising a body portion adapted to yieldingly embrace a tooth of said rake, and a yieldable band fast to said body portion and adapted to engage the head of said rake and hold said body portion on said tooth.

4. A guard for a rake having a head and teeth comprising a body portion adapted to yieldingly engage a tooth of said rake and having an arcuate ground-engaging surface embodied therein, and a yieldable band integral with said body portion and adapted to be expanded over the head of said rake and thereby hold the body portion on said tooth.

5. A guard for a rake having a head and teeth comprising a body portion constructed of a material having the characteristics of rubber and adapted to embrace a tooth of said rake, said body portion having an arcuate ground-engaging surface embodied therein eccentrically disposed to the point of said tooth, and a band integral with said body portion and adapted to be expanded over the head of said rake and thereby hold the body portion on said tooth.

6. A guard for a rake having a head and teeth comprising a body portion constructed of rubber and adapted to yieldingly embrace a tooth of said rake, said body portion being notched to receive the head of said rake and having an arcuate ground-engaging surface embodied therein eccentrically disposed to the point of said tooth, and a band integral with said body portion and adapted to be expanded over the head of the rake and thereby hold the body portion on said tooth.

WALTER K. FLAVIN.